United States Patent

[11] 3,550,914

[72] Inventor James T. Matsuoka
 Brecksville, Ohio
[21] Appl. No. 733,087
[22] Filed May 29, 1968
[45] Patented Dec. 29, 1970
[73] Assignee Intercole Automation, Inc.
 Cleveland, Ohio
 a corporation of Ohio

[54] MACHINE FOR PROCESSING RUBBER, PLASTIC AND THE LIKE AND METHOD
 3 Claims, 3 Drawing Figs.
[52] U.S. Cl. ................................. 259/104,
 29/201
[51] Int. Cl. .................................... B01f 7/02
[50] Field of Search ........................... 259/6, 21,
 41, 104, 131; 29/201

[56] References Cited
UNITED STATES PATENTS
2,820,618 1/1958 Bolling ........................ 259/104
2,840,399 6/1958 Harless et al. ................ 29/201(UX)

Primary Examiner—William I. Price
Attorney—Watts, Hoffmann, Fisher & Heinke

ABSTRACT: A machine for processing rubber, plastic, other elastomers and the like including a rotatable material processing member having a processing portion and a supporting shaft portion constructed so that a bearing support for the shaft portion of the rotatable processing member can be removed from the machine without disassembly of major component machine parts or relocation of a coupled drive unit.

INVENTOR.
JAMES T. MATSUOKA
BY
Watts, Hoffmann, Fisher & Heinke
ATTORNEYS.

INVENTOR.
JAMES T. MATSUOKA
BY
Watts, Hoffmann, Fisher & Heinke
ATTORNEYS.

MACHINE FOR PROCESSING RUBBER, PLASTIC AND THE LIKE AND METHOD

This invention provides a novel apparatus for processing rubber, plastic and the like, comprising a rotatable processing member so constructed and arranged to permit the removal of a bearing assembly for the processing member without removing the member or disassembling other major component parts of the apparatus. This invention also relates to methods of removing a bearing assembly from such apparatus.

Mixing machines suitable for mixing or working rubber, plastic and the like typically have two adjacent rotary members supported in end frames and driven in counter rotation to mix or work the material being processed into a homogeneous mass. Shaft portions of the rotary members are supported in bearings in the end frames and at least one of the members is directly coupled to an output shaft of a gear reducer that is driver by a large electric motor. A dust seal surrounds each shaft portion and provides a seal about the shaft portion between the mixing chamber and the shaft supporting bearing. Because of the large size and weight of these machines and the high horsepower and heavy loads applied to the rotary members, bearing wear is a significant problem. Furthermore, increased bearing clearance that results from bearing wear subjects the dust seals to wear, which impairs their effectiveness. As wear clearance increases, a point is reached where product leakage can damage the journal bearings and, conversely, the product material being mixed can become contaminated.

Previously, worn or damaged bearings in a mixing machine could be repaired or replaced only by substantially dismantling the machine, i.e., removing side members, end frames and rotary members, resulting in a substantial loss of production. Similar difficulties are encountered in the replacement of bearings that support the large rotary members of roll mills and the like used to process rubber, plastic and the like.

It is a principal object of the present invention to provide a machine of a type used to process rubber, plastic and the like in which bearings on a shaft portion of a large, relatively heavy, rotary processing member of the machine can be removed and replaced quickly and conveniently without removing the processing member supported by the bearings and without dismantling the machine.

It is another object of this invention to provide a novel method for removing a bearing from the shaft of a rotary processing member of a machine of the type referred to.

It is another object of this invention to provide a machine of the type referred to in which a bearing supported shaft of a rotary processing member extends from the machine, which shaft has a tapered intermediate portion to which the inner race of a bearing assembly is secured, the smaller end of the tapered portion being of a diameter equal to or greater than the diameter of any shaft portion located axially outward therefrom toward the end of the shaft, with a hydraulic bearing removal groove in the tapered portion and a conduit thereto extending through the shaft from an outer portion thereof, whereby the bearing assembly can be hydraulically loosened from the shaft, moved axially from the tapered portion along the shaft and removed from the machine without removing the shaft or disassembling major components of the machine.

It is another object of this invention to provide a machine of the type referred to with a bearing supported shaft constructed and arranged as described above and coupled to an driven by an axially aligned shaft spaced therefrom a distance great enough to permit removal of the coupling and bearing assembly through the space between the two shafts.

It is a related and more specific object of this invention to provide a machine of the type described in which a spaced axially aligned drive shaft is connected to the bearing supported shaft with gearlike members secured to the adjacent ends of the shafts and an internally splined gearlike coupling member engaged with the gearlike members and extending across the distance between the shafts, the gearlike members on the shafts being axially shorter than the distance between the shafts so that they and the bearing assembly can be removed between the two shafts.

It is another object of this invention to provide a mixing machine of the type used to process rubber, plastic and the like and which includes end frames and sides providing a mixing chamber, and a pair of rotary processing members within the mixing chamber with shafts extending through an end frame, wherein each shaft has an axially extending portion adjacent the end frame through which it extends that is tapered outwardly of the frame, which is of a diameter at the smaller end of the tapered portion equal to or greater than the diameter of any portion of the shaft located axially outward therefrom and which is supported by a roller bearing assembly in the end frame, which bearing assembly includes an inner race with a tapered bore secured about the tapered portion of the shaft, an outer race secured to the end frame of the machine, and a plurality of bearing rollers therebetween, wherein the tapered surface of the shaft is constructed to permit removal of the inner race of the bearing assembly, an axially aligned shaft of a drive unit is spaced from the end of the bearing supported shaft, a gearlike member is secured to the end of each aligned shaft and an internally splined split coupling member connects the gearlike members across the space between the aligned shafts, said aligned shafts being spaced an axial distance greater than the axial length of the parts of the bearing assembly and the gearlike members on the end of the bearing supported shaft.

The invention resides in certain constructions and combinations and arrangements of parts, and in certain method steps, and further objects and advantages of the invention will be apparent to those skilled in the art to which it relates from the following description of the preferred embodiment and method described with reference to the accompanying drawings forming a part of this specification, in which similar reference characters designate corresponding parts, and in which.

With reference to the drawings, a mixing machine embodying the present invention is indicated generally at A and includes a mixer B in which material such as rubber, plastic or the like is mixed by rotors, and a drive unit C in the form of a motor driven gear reducer that drives the rotors of the mixer B.

Figure 1:
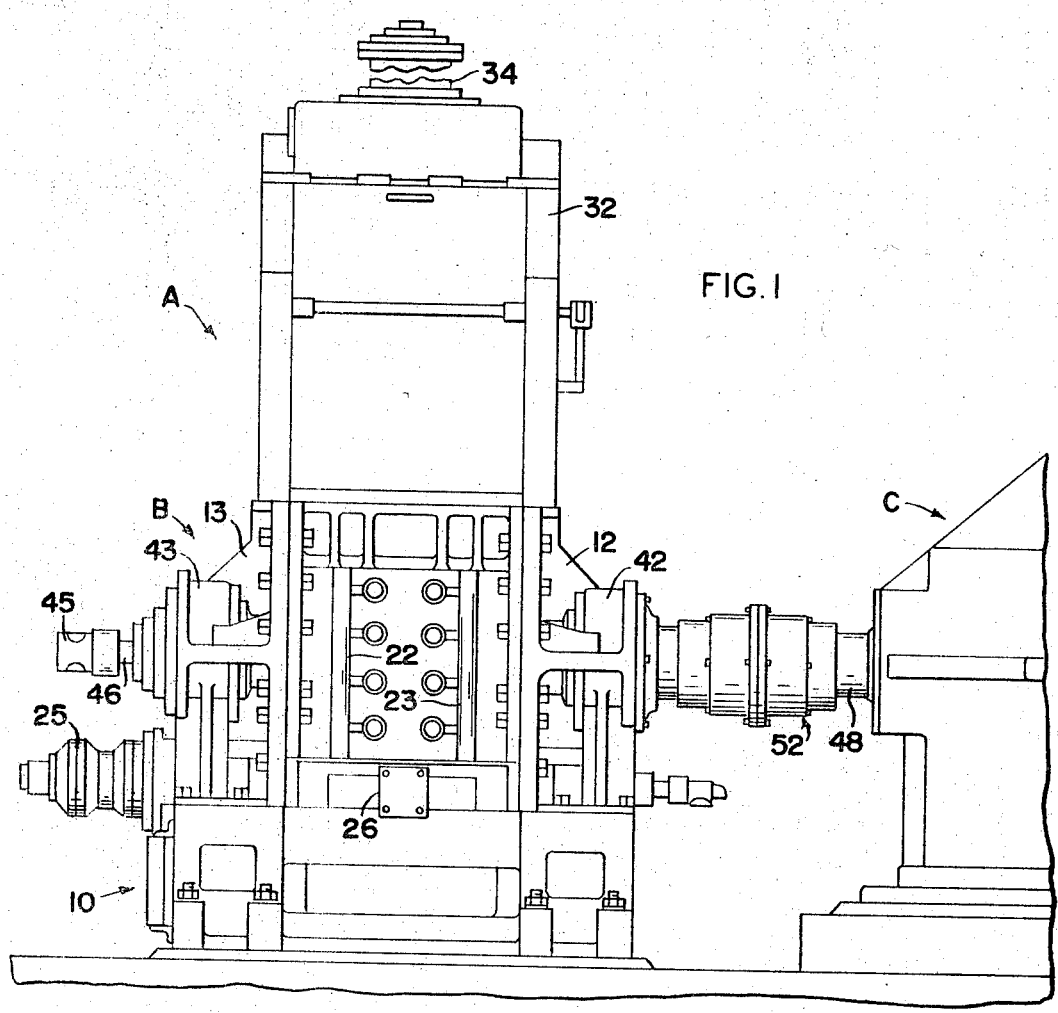
FIG. 1 is a partial side elevational view of a mixing machine and drive unit embodying the present invention.
Figure 2:
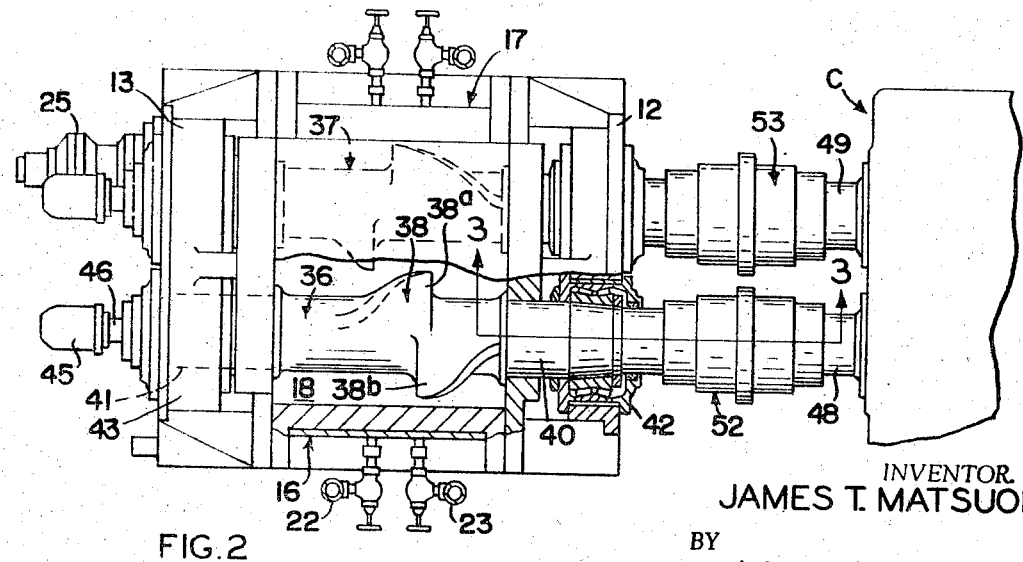
FIG. 2 is a partial plan view of the mixing machine and drive unit shown in FIG. 1, with parts removed and parts in section.

The mixer B includes a heavy, fabricated, base structure 10 that supports two opposite end frames 12, 13 and intermediate side members 16, 17, which together define a mixing chamber 18 (FIG. 2). The temperature of the side members can be controlled by fluid introduced through headers 22, 23 which communicate with conduits within the side members. The chamber has a lower opening for discharging material after mixing. The lower opening is closed by a pivoted discharge door (not shown) that is operated by a rotary actuating hydraulic cylinder 25 and released by a slidable latch operated by fluid cylinder 26. The side members 16, 17 provide a top opening at the base of a vertical feed hopper 32. A cylinder 34 on top of the feed hopper 32 actuates a vertically sliding ram (not shown) that closes the top opening of the chamber 18.

Two horizontal, side-by-side, rotating processing members 36, 37 (FIG. 2) are located within the mixing chamber 18. Each processing member in the embodiment shown is a mixing rotor having a bladed portion 38 with a plurality of blades and rotor shaft portions 40, 41 extending from opposite ends of the bladed portion. The mixing rotor 36 has two blades 38a, 38b each in the form of a helix adjacent opposite ends of the bladed portion and twisting in opposite directions, as shown. The shaft portions 40, 41 are journaled in bearings in journal boxes 42, 43 in the end frames 12, 13, respectively. The shaft portion 40 extends from the journal box 42 and is coupled to the drive unit C. A rotary union 45 couples a pipe 46 from the shaft portion 41 at the opposite end of the rotary processing member to a source of fluid supply for circulating fluid, typically coolant, within the rotor during operation. The member 37 is essentially identical to the member 36, except that the blades twist in opposite directions about the rotor body.

The drive unit C is a compound drive reducer driven by an electric motor (not shown) and has two side-by-side, counter-rotating, output shafts 48, 49. The output shafts 48, 49 are each connected to one of the rotors 36, 37, respectively, by coupling assemblies 52, 53. The construction of both rotors and couplings and the manner in which the rotors are supported is identical for each, and only the specific construction of the rotor 36 and coupling 52 will be described in detail.

Figure 3:
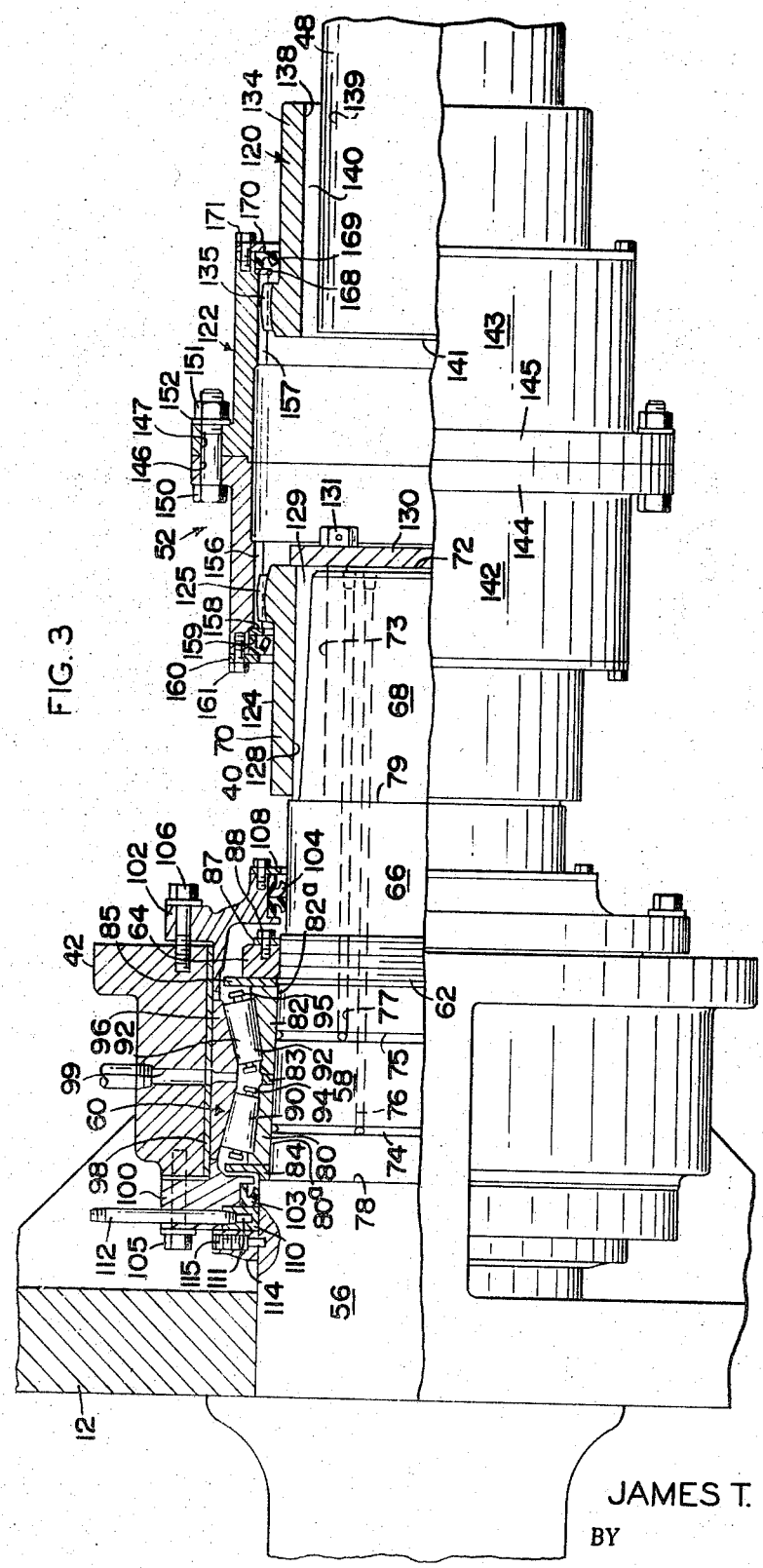
FIG. 3 is a view partly in section and partly in elevation along the line 3–3 of FIG. 2 and looking in the direction of the arrows.

The rotor shaft 40 of rotor 36, along with the end frame construction and bearing support, is shown in detail in FIG. 3 of the drawings. The shaft 40 has a cylindrical portion 56 that extends through a wall portion of the end frame 12 which in part defines the mixing chamber 18; an outwardly tapered portion 58 within the journal box 42 of the end frame 12, to be supported by a bearing assembly 60; a cylindrical threaded portion 62 for receiving a bearing lock nut 64; a cylindrical portion 66 extending from the journal box 42; and a tapered end portion 68 for supporting a gearlike or externally splined coupling member 70 of the coupling assembly 52, with an end surface 72 and a keyway 73. Two spaced annular hydraulic bearing removal grooves 74, 75 are formed in the tapered portion 58 and communicate through internal conduits 76, 77 respectively, which extend through the shaft 40 and open through the end surface 72. The cylindrical portion 56 of the shaft 40 is of larger diameter than the larger end of the tapered portion 58, forming a shoulder 78. The smaller end of the tapered portion 58 is of equal or greater diameter than all subsequent shaft portions from the tapered portion 58 to the end surface 72. The tapered end portion 68 is, at its larger diameter end, smaller than the adjacent cylindrical portion 66, forming a shoulder 79 therebetween.

The bearing assembly 60 that rotatably supports the shaft 40 is a two-row double cup, single-cones tapered roller bearing that will sustain radial as well as thrust loads. The assembly includes inner races in the form of two cones 80, 82 with an annular spacer 83 between the two cones that establishes a running clearance for the bearing. Each cone has a tapered bore 80a, 82a which is of suitable slope and diameter to fit in frictional engagement with the tapered portion 58 of the shaft 40 and to respectively overlie one of the bearing removal grooves 74, 75. The cone 80 abuts an inside oil flinger ring 84, which in turn abuts the shoulder 78 formed by the cylindrical shaft portion 56. The outer end of the cone 82 is abutted by an outside oil flinger ring 85, which is retained by the bearing lock nut 64, which is in threaded engagement with the threaded portion 62 of the shaft. A lock plate 87 is secured to the outer surface of the bearing lock nut 64 by spaced screws 88.

A row of tapered rollers 90 roll in the cone 80, and a second row of tapered rollers 92 roll in the cone 82. Cages 94, 95 retain the rollers of each row in proper spaced relationship. An outer race in the form of a cup 96 surrounds the rows of tapered rollers 90, 92, supporting the rollers and shaft 40 within the bearing box 42. The cup 96 is supported within a sleeve 98, which in turn is directly mounted within the journal box 42 of the end frame 12. A lubricating passageway 99 extends through the journal box 42, sleeve 98 and cup 96 for lubricating the bearing. The cup 96 is retained by an inner retainer 100 and an outer retainer 102, each secured by a plurality of screws 105, 106, respectively, to opposite ends of the journal box 42. The retainers 100, 102 have closure seals 103, 104, respectively. The outer closure seal 104 is retained by an outside seal retainer 108, and the inner closure seal 103 is retained by an annular temperature-controlled gland 110 with an internal passageway 111 communicating through a conduit 112 and a second conduit (not shown) which circulate water or steam through the gland. A retainer ring 114 secured to the cylindrical portion 56 of the shaft 40 by a socket setscrew 115 abuts the gland 110 and inside bearing retainer 100.

The coupling assembly 52 between the rotor shaft 40 and the gear reducer output shaft 48 includes the gearlike coupling member 70 on the shaft 40, a similar gearlike coupling member 120 on the shaft 48, and an internal gearlike or splined coupling member 122 spanning the distance between the two shafts and coupling the two gearlike coupling members 70, 120 so as to transmit rotation from one to the other.

The gearlike coupling member 70 on the shaft 40 includes a hub portion 124, gearlike teeth 125 at the outer end portion of the hub, a central tapered bore that receives the tapered end portion 68 of the shaft 40, and a keyway 128 for receiving a key 129. The axial length of the gearlike member 70 is slightly shorter than the axial length of the tapered portion 68 of the shaft 40, and the inner end of the hub 124 is adjacent to the shoulder 79. The key 129 within the keyway 73 of the shaft and the keyway 128 of the gearlike member 70 couples the member 70 to the shaft. A coupling retainer 130 adjacent to the end surface 72 of the shaft 40 abuts the outer end of the gearlike member 70. Screws 131 secure the coupling retainer to the shaft 40.

The gear member 120 on the reducer output shaft 48 includes a hub portion 134, gear teeth 135 adjacent the outer end of the hub, a central cylindrical bore that receives the outer end of the shaft 48, and a keyway 138. A keyway 139 is provided in the shaft 48 and a key 140 couples the gearlike member 120 to the shaft 48. As shown, the gearlike member 120 is substantially flush with an outer end 141 of the shaft 48.

The coupling member 122 is split transversely, being formed of two annular or ring portions 142, 143, which cooperate respectively with the gear members 70, 120. Facing end flanges 144, 145 of the two portions 142, 143, respectively abut each other and are connected through aligned holes 146, 147 by bolts 150 and nuts 151 and associated lock washers 152. Each coupling portion 142, 143 includes internal gear teeth or splines 156, 157, respectively. An outer seal abutment ring 158 and an annular seal 159 are located to the outside of the gear teeth 156 to form a seal with the hub portion 124 of the member 70. The seal 159 is held in place by a seal retainer 160 fastened by screws 161 to the outer edge of the annular coupling portion 142. A seal abutment ring 168 and an annular seal 169 are located adjacent the outer edge of the gear teeth 157 and form a seal with the hub portion 134 of the member 120. The seal is held in place by a seal retainer 170 secured to the outer end of the annular coupling portion 143 by screws 171. Alternatively, a one piece internal gearlike coupling member can be used, identical in construction to the coupling assembly 52 except that the two ring portions 142, 143 are integral, eliminating the end flanges 144, 145 and fasteners 150, 151.

The mixer B and the drive unit C are positioned relative to one another so that the end surface 72 of the shaft 40 and the end surface 141 of the shaft 48 are spaced apart a distance greater than the axial length of the annular split portion 142 of the coupling member 122, the gearlike member 70 and the bearing assembly 60. With this construction and arrangement, when it is necessary to adjust, repair or replace the bearing assembly 60, the shaft 40 need not be removed from the mixer B, nor need the end frames 12, 13 or side members 16, 17 be removed. Rather, the external coupling member is first removed from the gearlike members 70 and 120, the screws 131 are withdrawn, coupling retainer 130 is removed, and the gearlike member 70 is then moved axially into the space between the two shafts 40, 48. Being shorter than the axial distance between the ends of the shafts, the gearlike member can be removed laterally. With a two piece external coupling member 122, as shown, it is removed by separating it into its two annular portions 142, 143 by removing the nuts 151 and bolts 150. The portion 143 is moved axially along the gearlike member 120 toward the drive unit C until it is behind the end surface 141 of the shaft 48. The coupling portion 142 and the member 70 are moved axially over the end 68 of the shaft 40 until the flange 146 is essentially flush with the outer end of the shaft 48, i.e., so that the hub portion 142 and gearlike member 70 are telescoped and occupy only the axial space of the gearlike member. This portion is then removed with the gearlike member 70. If a one-piece external coupling member (not shown) is used, the seal and retainer adjacent the gearlike member 70 corresponding to the seal 159 and retainer 160 of coupling 53, are removed and the entire coupling is moved axially over the gearlike member 120 and along the shaft 48 of the gear reducer so that the space between the shafts 40, 48 is unobstructed. This requires a slightly longer projection of the shaft 48 to accommodate the length of the coupling.

The outside bearing retainer 102 is next removed from the journal box 42 of the end frame and the lock nut 64 is unthreaded from the threaded portion 62 of the shaft, these parts being moved axially along the shaft and removed transversely through the space between the ends of the two shafts 40, 48. The outside oil flinger 85 is then removed. Hydraulic fluid under pressure is then introduced through the conduits 76, 77 to the hydraulic bearing removal grooves 74, 75 each of which underlies one of the cones 80, 82 of the bearing assembly. The hydraulic pressure expands the race cones to permit axial sliding along the tapered portion 58 of the shaft. By virtue of the tapered shaft portion 58 and the tapered bore of each bearing cone 80, 82, the slightest outward axial movement establishes clearance between the shaft and race cones so that the bearing can be easily moved along the shaft 40 to the gap between the ends of the two shafts 40, 48. Once the outer cone 82 is removed, the cup 96 is moved axially along the shaft 40 to the gap, and then the inner race cone 80. Assembly is, of course, accomplished in the reverse order.

From the foregoing description of the preferred embodiment of the invention, it will be apparent that the objects heretofore enumerated and others have been accomplished and there has been provided a novel machine of a type used to process rubber, plastic and the like in which, and a novel method by which, bearings on a tapered shaft portion can be removed from the machine without disturbing the major component parts of the machine, thereby materially reducing the time required for adjustment, repair or replacement.

Although the invention has been described in a detailed manner and with reference to a specific embodiment, it should be understood that the invention is not limited thereto but rather the invention includes all adaptations and modifications within the scope of the appended claims.

I claim:

1. In combination, a machine for processing rubber, plastic and the like and a drive unit in fixed spaced relationship therewith, a rotatable processing member forming a part of said machine with a first shaft or shaft portion journaled for rotation and extending outwardly of said machine, a second shaft extending from said drive unit in axial alignment with said first shaft, an intermediate axially extending portion on said first shaft that is tapered outwardly of the machine and which at the smaller end of the tapered portion is of equal or greater diameter than any portion located axially outward therefrom, a bearing assembly in the machine supporting the shaft at the tapered portion for rotation, said bearing assembly including an inner race with a tapered bore secured about the tapered portion of the shaft, an outer race secured to the machine and a plurality of rolling elements therebetween, a hydraulic bearing removal groove in the tapered portion of the shaft, and encircled by said inner race, and a conduit through the shaft from the outer extending portion of the shaft to said groove through which fluid under pressure can be introduced to said groove to expand the inner race, said first shaft being axially spaced from said second shaft a distance greater than the axial length of the parts of said bearing assembly, an externally splined member secured to the end of each said shaft, the externally splined member on said first shaft being of shorter axial length than the distance between said shafts, and an internally splined coupling member engaged with said externally splined members, extending across the distance between the said shafts, and movable axially of said shafts, whereby said externally splined member on said first shaft and said bearing assembly can be removed through the gap between the first and second shafts.

2. In combination, a machine for processing rubber, plastic and the like and a drive unit in fixed spaced relationship therewith, a rotatable processing member forming a part of said machine with a first shaft or shaft portion journaled for rotation and extending outwardly of said machine, a second shaft extending from said drive unit in axial alignment with said first shaft, an intermediate axially extending portion on said first shaft that is tapered outwardly of the machine and which at the smaller end of the tapered portion is of equal or greater diameter than any portion located axially outward therefrom, a bearing assembly in the machine supporting the shaft at the tapered portion for rotation, said bearing assembly including an inner race with a tapered bore secured about the tapered portion of the shaft, an outer race secured to the machine and a plurality of rolling elements therebetween, a hydraulic bearing removal groove in the tapered portion of the shaft and encircled by said inner race, and a conduit through the shaft from the outer extending portion of the shaft to said groove through which fluid under pressure can be introduced to said groove to expand the inner race, said first shaft being axially spaced from said second shaft a distance greater than the axial length of the parts of said bearing assembly, and means coupling the two adjacent ends of the shafts together for rotation, said means being removable from said first shaft so that the bearing assembly can be moved axially along the first shaft to the gap between the first and second shafts and removed from the machine.

3. In a method of removing an antifriction bearing from a shaft of a rotary processing member of a machine for processing material such as rubber, plastic and the like, without disassembling major components of the machine such as frame members and the like, which shaft is coupled to an axially aligned shaft of a drive unit with a space between adjacent ends of the shafts, the steps of uncoupling said shafts without moving either shaft axially, introducing fluid under pressure between said shaft of the rotary processing member and a bearing race on a portion of the shaft tapered outwardly of the machine toward the shaft of the drive unit to expand the race, moving the race axially along the tapered portion of the shaft to smaller diameter portions while maintaining said fluid under pressure, moving the race along the shaft to a position axially between said shaft of the rotary working member and said drive shaft and removing the race transversely of the shafts from the position therebetween.